US012391490B2

(12) United States Patent
Foley

(10) Patent No.: US 12,391,490 B2
(45) Date of Patent: Aug. 19, 2025

(54) CONVEYOR BELT CLEANING APPARATUS

(71) Applicant: IBL Solutions Ltd., Stony Plain (CA)

(72) Inventor: Shawn Foley, Stony Plain (CA)

(73) Assignee: IBL Solutions Ltd., Stony Plain (CA)

( * ) Notice: Subject to any disclaimer, the term of this patent is extended or adjusted under 35 U.S.C. 154(b) by 378 days.

(21) Appl. No.: 17/812,539

(22) Filed: Jul. 14, 2022

(65) Prior Publication Data

US 2024/0017936 A1 Jan. 18, 2024

(51) Int. Cl.
*B65G 45/10* (2006.01)
*B65G 45/12* (2006.01)
*B65G 45/24* (2006.01)
*B65G 45/26* (2006.01)

(52) U.S. Cl.
CPC .................. *B65G 45/10* (2013.01)

(58) Field of Classification Search
None
See application file for complete search history.

(56) References Cited

U.S. PATENT DOCUMENTS

| | | | | |
|---|---|---|---|---|
| 4,226,325 A * | 10/1980 | Vandas | ............... | B65G 45/22 198/493 |
| 4,573,567 A * | 3/1986 | Swinderman | .......... | B65G 21/00 160/354 |
| 7,044,287 B1 * | 5/2006 | Gray | .................. | B65G 45/22 198/494 |
| 8,348,046 B1 * | 1/2013 | Baumgardner | ........ | B65G 45/22 198/496 |
| 9,032,976 B2 * | 5/2015 | Berntsen | ............... | B65G 45/22 134/131 |
| 9,376,264 B1 * | 6/2016 | Foley | .................... | B65G 47/72 |
| 10,507,986 B2 * | 12/2019 | Rogan | ................... | B65G 45/26 |
| 2020/0062513 A1 * | 2/2020 | Hutchison | ............. | B65G 45/12 |
| 2022/0163258 A1 * | 5/2022 | Steffensen | ............... | F26B 3/12 |

* cited by examiner

*Primary Examiner* — Kavel Singh
(74) *Attorney, Agent, or Firm* — Orin Del Vecchio

(57) ABSTRACT

A conveyor belt cleaning apparatus configured to be operably coupled to a conveyor belt and provide cleaning thereof. The present invention includes a housing having an upper portion and a lower portion. The upper portion of the housing includes walls defining the shape thereof and includes an interior volume with an upper and lower opening. A cleaning member support element is moveably disposed within the interior volume of the upper portion. A plurality of cleaning members extend upward from cleaning member support element and are finger like in arrangement. The lower portion of the housing includes a first segment and a second segment being adjacent each other. The first segment and second segment are cone-shaped and are operably coupled to a vacuum source. A movement member is operably coupled to the cleaning member support element and is configured to provide an upwards-downwards movement thereof.

14 Claims, 5 Drawing Sheets

CONVEYOR BELT CLEANING APPARATUS

FIELD OF THE INVENTION

The present invention relates generally to conveyor belt maintenance, more specifically but not by way of limitation, a conveyor belt cleaning apparatus that is configured to be operably coupled to a conveyor belt and provide cleaning thereof wherein the present invention provides many advantages over the existing technology.

BACKGROUND

Belt conveyors will accumulate dirt on the return strand, as the conveyed material is constantly being scraped by other parts of the installation and therefore enters the conveyor line. To prevent the accumulation of dirt or to reduce it to acceptable levels, conveyor belts must be cleaned after the discharge point. High-performing belt cleaners keep belts clean, eliminating carryback and make conveyor systems safer and more productive. Eliminating carryback reduces fugitive material and minimizes the cost of unnecessary cleanup and maintenance of the conveyor belt system. Scraping the conveyor belt clean at the head pulley will eliminate carryback and keep bulk materials moving in the right direction through transfer points or into containers. If the conveyor belt is not properly and routinely cleaned the material that is carried back under the belt often ends up inside the conveyor system and can damage rollers and idlers which can further causes the conveyor belt to wander and fray.

Controlling fugitive material in the form of dust and spillage has been recognized as a key factor in maximizing conveyor efficiency and safety. One way that users of conveyor belts minimize fugitive material is by using belt cleaners to remove carryback before it can escape from the system. Most designs of conveyor belt cleaning technologies available today are blade-type units using a scraper mounted on the head pulley to remove material from the belt's surface. These devices typically require a tensioner to hold the cleaning edge against the belt. Because the scraper directly contacts the belt, the scraper is subject to abrasive wear and must be regularly adjusted and periodically replaced to maintain effective cleaning performance. Additionally, conventional scrapers will often have a blade that is wider than the material load which can cause the center section of the blade to wear faster than the edges because there is more abrasive cargo in the middle. This results in an increase in carryback as the scraper shape has been comprised and doesn't execute the desired task over a sufficient period of time.

Accordingly, there is a need for a conveyor belt cleaning apparatus that is configured to provide improved cleaning of a conveyor belt that employs elements such as but not limited to belt engagement members and dual cone lower portions so as to provide improved cleaning of conveyor belts.

SUMMARY OF THE INVENTION

It is the object of the present invention to provide a conveyor belt cleaning apparatus operable to provide cleaning of a conveyor belt during operation thereof wherein the present invention includes a housing having an upper portion and a lower portion.

Another object of the present invention is to provide an apparatus operably coupled to a conveyor belt so as to provide removal of material therefrom wherein upper portion of the housing is rectangular in shape having an interior volume and with an upper opening and a lower opening.

A further object of the present invention is to provide a conveyor belt cleaning apparatus operable to provide cleaning of a conveyor belt during operation thereof wherein the upper portion includes a cleaning member support element moveably disposed therein.

Still another object of the present invention is to provide an apparatus operably coupled to a conveyor belt so as to provide removal of material therefrom wherein the cleaning member support element includes a plurality of cleaning members operably coupled thereto extending upwards therefrom.

An additional object of the present invention is to provide a conveyor belt cleaning apparatus operable to provide cleaning of a conveyor belt during operation wherein the present invention further includes a lifting member operably coupled to the cleaning member support element so as to provide vertical adjustment thereof.

Yet a further object of the present invention is to provide an apparatus operably coupled to a conveyor belt so as to provide removal of material therefrom wherein the lower portion of the housing includes a first cone shaped segment and a second cone shaped segment.

Another object of the present invention is to provide a conveyor belt cleaning apparatus operable to provide cleaning of a conveyor belt during operation wherein the first cone shaped segment and second cone shaped segment are comprised of outer walls having an angular orientation so as to inhibit buildup of material on the inner surface thereof.

Still another object of the present invention is to provide an apparatus operably coupled to a conveyor belt so as to provide removal of material therefrom wherein the lower portion is operably coupled to a vacuum source.

An additional object of the present invention is to provide a conveyor belt cleaning apparatus operable to provide cleaning of a conveyor belt during operation wherein the upper portion of the housing includes a drop gate member extending generally the width thereof wherein the drop gate member is configured to provide access to the interior volume of the upper portion.

Yet a further object of the present invention is to provide an apparatus operably coupled to a conveyor belt so as to provide removal of material therefrom wherein the upper portion of the housing further includes an inspection window formed in one side thereof.

Still an additional object of the present invention is to provide a conveyor belt cleaning apparatus operable to provide cleaning of a conveyor belt during operation wherein the present invention is positioned underneath a conveyor belt on the return side thereof.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
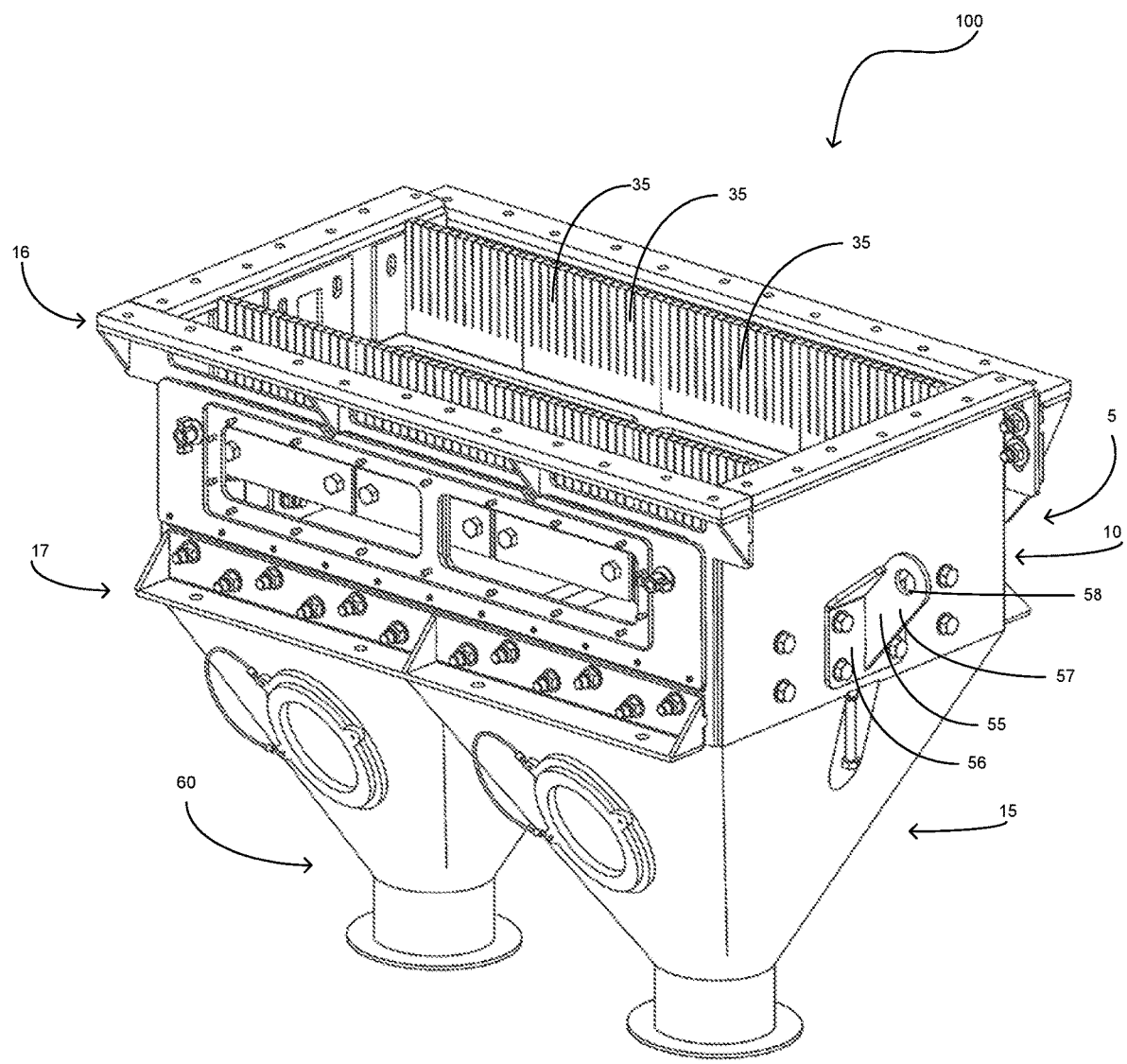
FIG. 1 is a perspective view of a preferred embodiment of the present invention.
Figure 2:
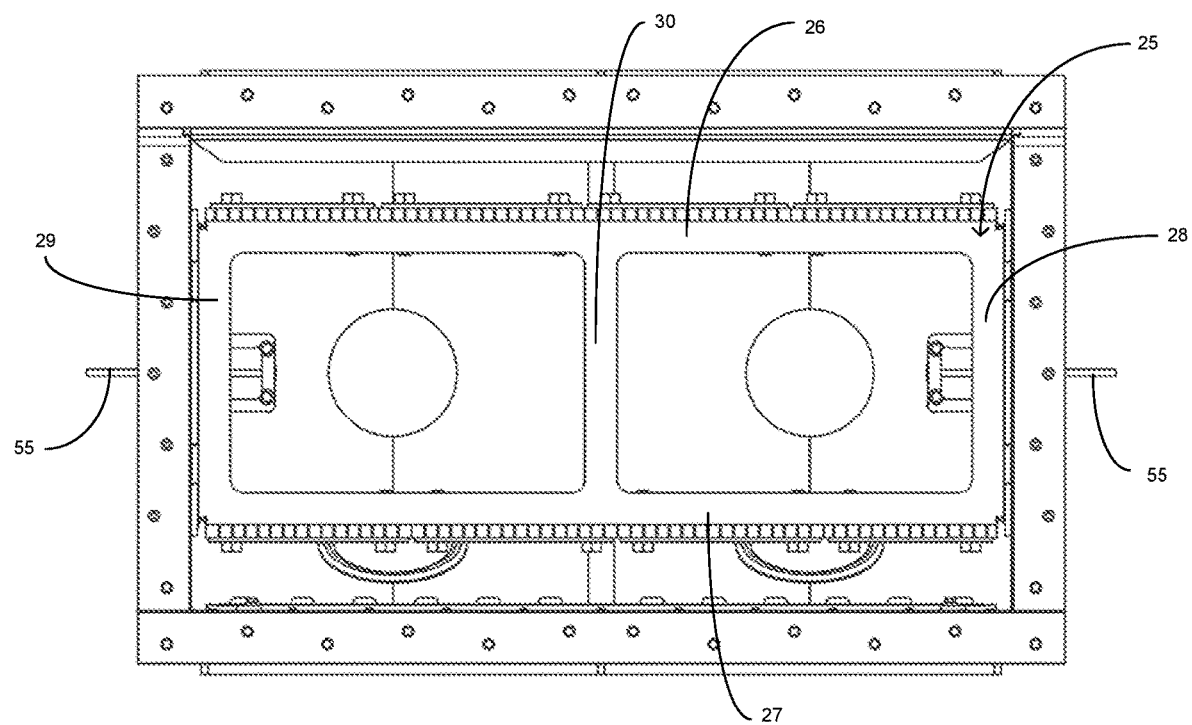
FIG. 2 is a top view of the present invention.
Figure 3:
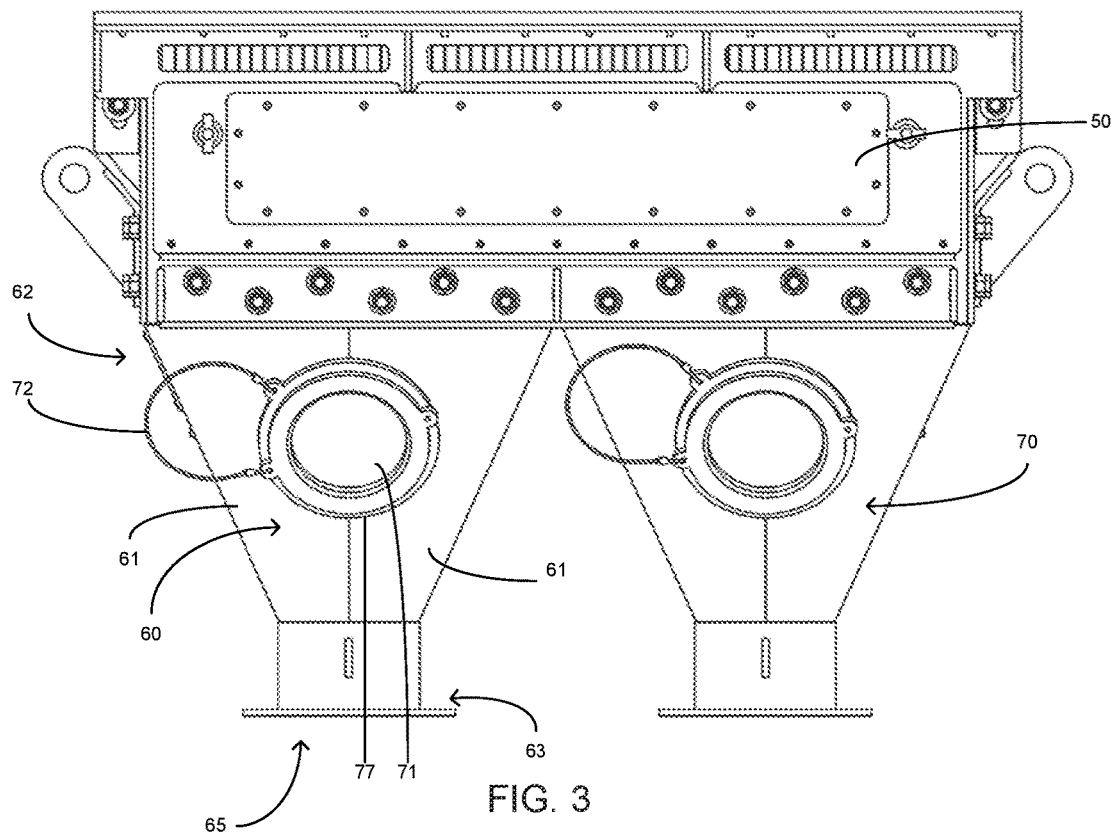
FIG. 3 is a first side view of the present invention.
Figure 4:
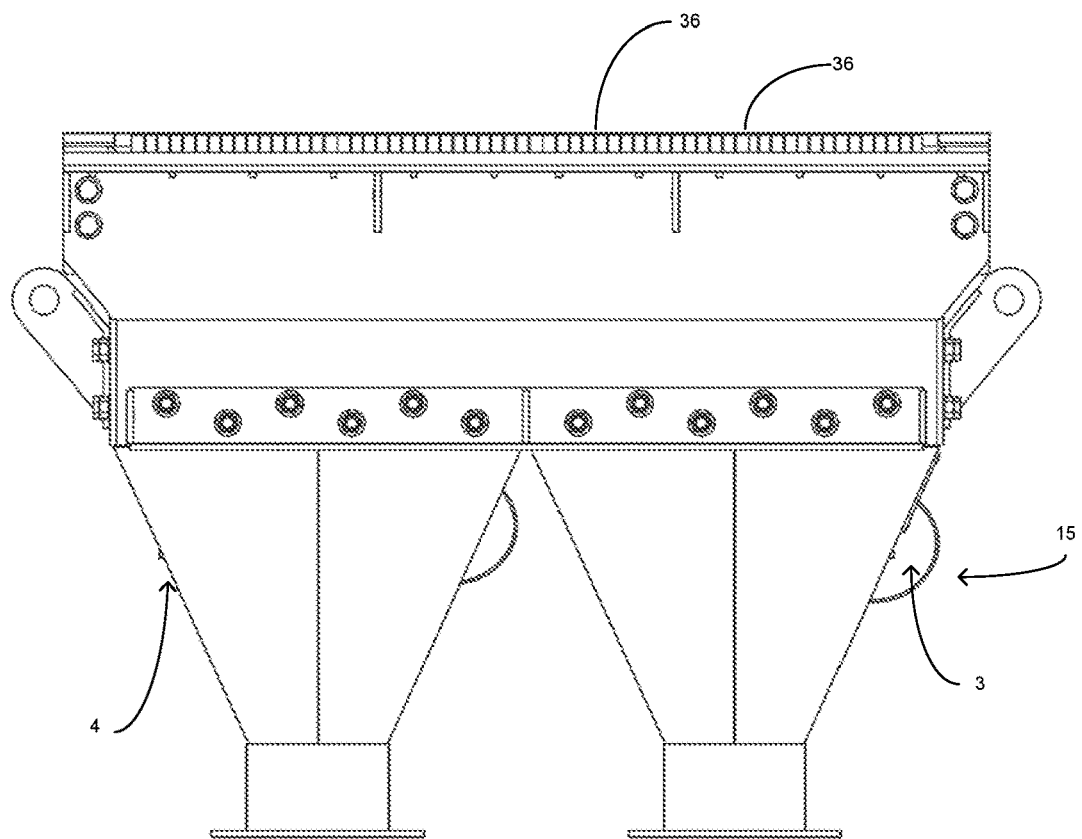
FIG. 4 is a second side view of the present invention.
Figure 5:
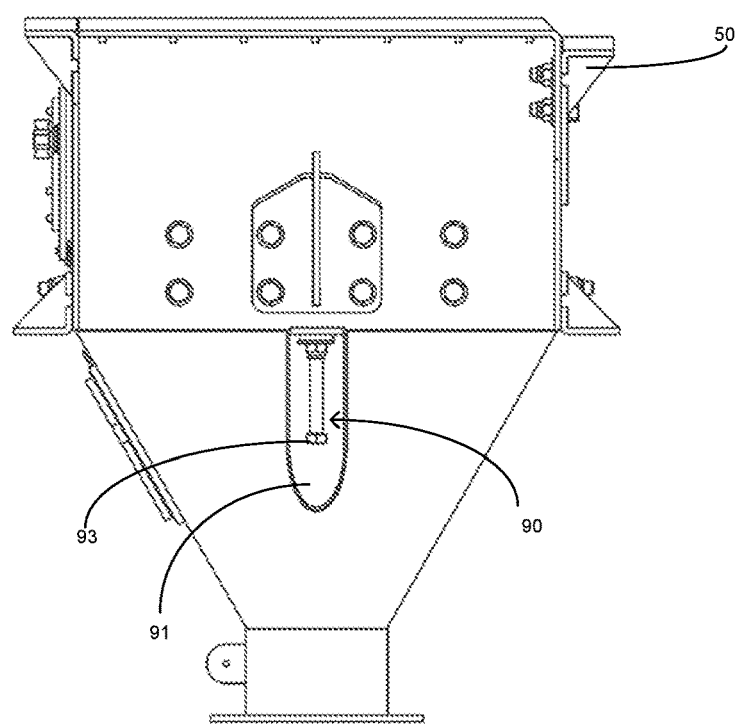
FIG. 5 is a first end view of the present invention.

Referring now to the drawings submitted herewith, wherein various elements depicted therein are not necessarily drawn to scale and wherein through the views and figures like elements are referenced with identical reference numerals, there is illustrated a conveyor belt cleaning apparatus 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Referring in particular to the Figures submitted as a part hereof, the conveyor belt cleaning apparatus 100 includes a housing 5 wherein the housing 5 includes an upper portion 10 and a lower portion 15. The upper portion 10 and lower portion 15 are operably coupled utilizing suitable mechanical techniques. The housing 5 is manufactured from a durable rigid material such as but not limited to metal. The upper portion 10 in a preferred embodiment is rectangular in shape having four walls 11 wherein the walls 11 are operably coupled utilizing suitable techniques. The four walls 11 define an interior volume 12. The upper portion 10 includes an upper opening 13 and a lower opening 14 wherein the upper opening is proximate the upper end 16 of the upper portion 10 and the lower opening 14 is proximate the lower end 17 of the upper portion 10. Circumferentially present to the upper opening 13 is flange member 20. Flange member 20 is positioned so as to be perpendicular to the upper edge of the upper portion 10 and extend outward therefrom. The flange member 20 is utilized to secure the conveyor belt cleaning apparatus 100 in a desired position underneath a conveyor belt. It should be understood within the scope of the present invention that the conveyor belt cleaning apparatus 100 could employ alternate elements in addition to or in conjunction with the flange member 20 to achieve the desired objective as discussed herein.

The upper portion 10 has disposed in the interior volume 12 thereof a cleaning member support element 25. The cleaning member support element 25 includes a first longitudinal support member 26 and a second longitudinal support member 27. Operably coupled to opposing ends of the first longitudinal support member 26 and second longitudinal support member 27 are the lateral support members 28, 29. The cleaning member support element 25 is rectangular in shape and further includes a cross support member 30 for structural support of the cleaning member support element. It should be understood within the scope of the present invention that the cleaning member support element 25 could include more than one cross support member 30 or be provided without a cross support member 30. The cleaning member support element 25 as is further discussed herein is movable within the interior volume 12 in an upwards-downwards direction. The movement of the cleaning member support element 25 is operable to ensure the ability to place the plurality of cleaning members 35 in the desired position adjacent to and against the surface of a conveyor belt to which the conveyor belt cleaning apparatus 100 is operably coupled.

The cleaning members 35 are secured to the first longitudinal support member 26 and second longitudinal support member 27 utilizing suitable techniques and extend upwards therefrom. The cleaning members 35 are manufactured from urethane or similar material and are arranged such that a plurality of the cleaning members 35 are adjacent each other along the first longitudinal support member 26 and second longitudinal support member 27. The ends 36 of the cleaning members 35 are configured to engage a surface of a conveyor belt wherein each cleaning member 35 can independently flex and move depending upon the surface of the belt and any material thereon. Providing a plurality of independently moving cleaning members 35 provides improved cleaning of the conveyor belt and ensures a consistent engagement therewith across the width of the belt as opposed to a conventional scraper blade. Specifically, the independent cleaning members 35 have a longer dwell time on a conveyor belt as opposed to a conventional blade structure. It should be understood within the scope of the present invention that the cleaning members 35 could be configured to be either independently replaced or be replaced as a single set along either the first longitudinal support member 26 and second longitudinal support member 27.

The upper portion 10 includes an inspection window 40 formed in a wall 11 thereof. The inspection window 40 is formed in wall 11 utilizing suitable techniques and is rectangular in shape. A transparent covering 41 is mounted over the inspection window 40 so as to allow viewing into the interior volume 12 and further inhibit debris from egressing the inspection window 40. It should be understood within the scope of the present invention that the inspection window 40 could be provided in alternate sizes and shapes. Additionally, the upper portion 10 could have more than one inspection window 40 located in alternate walls 11. Located on the opposing side of the upper portion 10 from the inspection window 40 is a drop gate member 50. The drop gate member 50 is movably coupled to wall 11 and covers an aperture (not particularly illustrated herein) in the wall 11. The drop gate member 50 is movable between a first position and second position wherein in the second position the drop gate member 50 is moved downwards so as to permit access to the aperture adjacent thereto. Movement of the drop gate member 50 to its second position is performed during cleaning or maintenance procedures of the belt to which the conveyor belt cleaning apparatus 100 is operably coupled. It should be contemplated within the scope of the present invention that the drop gate member 50 could be provided in alternate sizes and shapes in order to achieve the desired objective discussed herein.

Secured to the exterior surface of the walls 11 on opposing ends of the upper portion 10 are lifting members 55. Lifting members 55 include base plate 56 secured to the wall 11 wherein the base plate 56 has a support plate member 57 operably coupled thereto and being angular in orientation therewith. The support plate 57 is perpendicular to the base plate 56 and includes an aperture 58 formed therein distal to the base plate 56. The lifting members 55 are provided so as to offer an element to engage during installation of the conveyor belt cleaning apparatus 100. It should be understood within the scope of the present invention that the lifting members 55 could be provided in alternate shapes and sizes so as to achieve the desired objective discussed herein.

The lower portion 15 of the conveyor belt cleaning apparatus 100 is operably coupled to the upper portion 10 utilizing suitable mechanical techniques. The lower portion 15 includes a first segment 60 and a second segment 70 wherein the first segment 60 and second segment 70 are identically constructed. The ensuing description of the first segment 60 should be understood as to apply to the second segment 70 as the first segment 60 and second segment 70 are identical. The lower portion 15 includes the first segment 60 and second segment 70 which are cone-shaped having a hollow interior volume and are operably coupled to a vacuum source (not illustrated herein). Having a first segment 60 and a second segment 70 allows the lower portion 15 to be manufactured at a lower height which is advantageous for certain applications wherein installation of the conveyor belt cleaning apparatus 100 can be difficult due to vertical clearance issues underneath a conveyor belt. Additionally, employment of the first segment 60 and second segment 70 facilitates the requirement of a lower cubic feet per minute for the vacuum source to effectively operate and remove material scraped from the conveyor belt by the cleaning members 35. This allows a vacuum source to be utilized that is smaller and more energy efficient as well as provides flexibility in the proximity of the vacuum source to the conveyor belt cleaning apparatus 100 in order to provide effective operation.

The first segment 60 includes walls 61 that are integrally formed utilizing suitable techniques. The walls 61 form a cone shape wherein the first segment 60 tapers in width from the upper end 62 to the lower end 63. The tapered angle of the walls 61 ensures minimal buildup within the interior volume of the first segment 60. In a preferred embodiment of the present invention the angles of the walls 61 are provided at an angle between thirty-five and seventy-five degrees. The angular orientation of the walls 61 promotes the movement of material cleaned from the conveyor belt to be transferred effectively out the end port 65 that is operably coupled to a vacuum hose (not illustrated herein). Formed in one of the walls 61 is clean-out port 77. The clean-out port 77 provides access to the interior volume of the first segment 60 so as to perform desired cleaning and maintenance thereof. The clean-out port 77 has releasably secured therein a port cover 71. Port cover 71 is manufactured from rubber and is configured to be press fit into the clean-out port 77. A handle 72 is provided to facilitate removal of the port cover 71. It is contemplated within the scope of the present invention that the first segment 60 and second segment 70 could have more than one clean-out port 77 and wherein the clean-out port 77 could be formed in alternate shapes and sizes.

Figure 6:
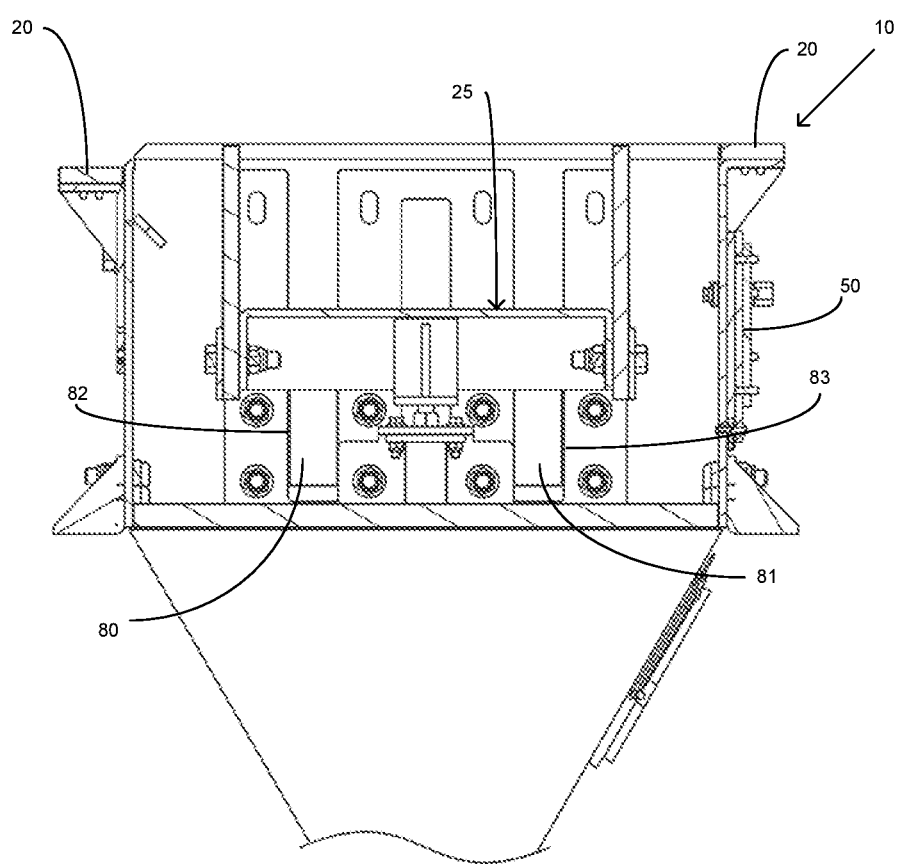
FIG. 6 is a cross-sectional view of the present invention.
Figure 7:
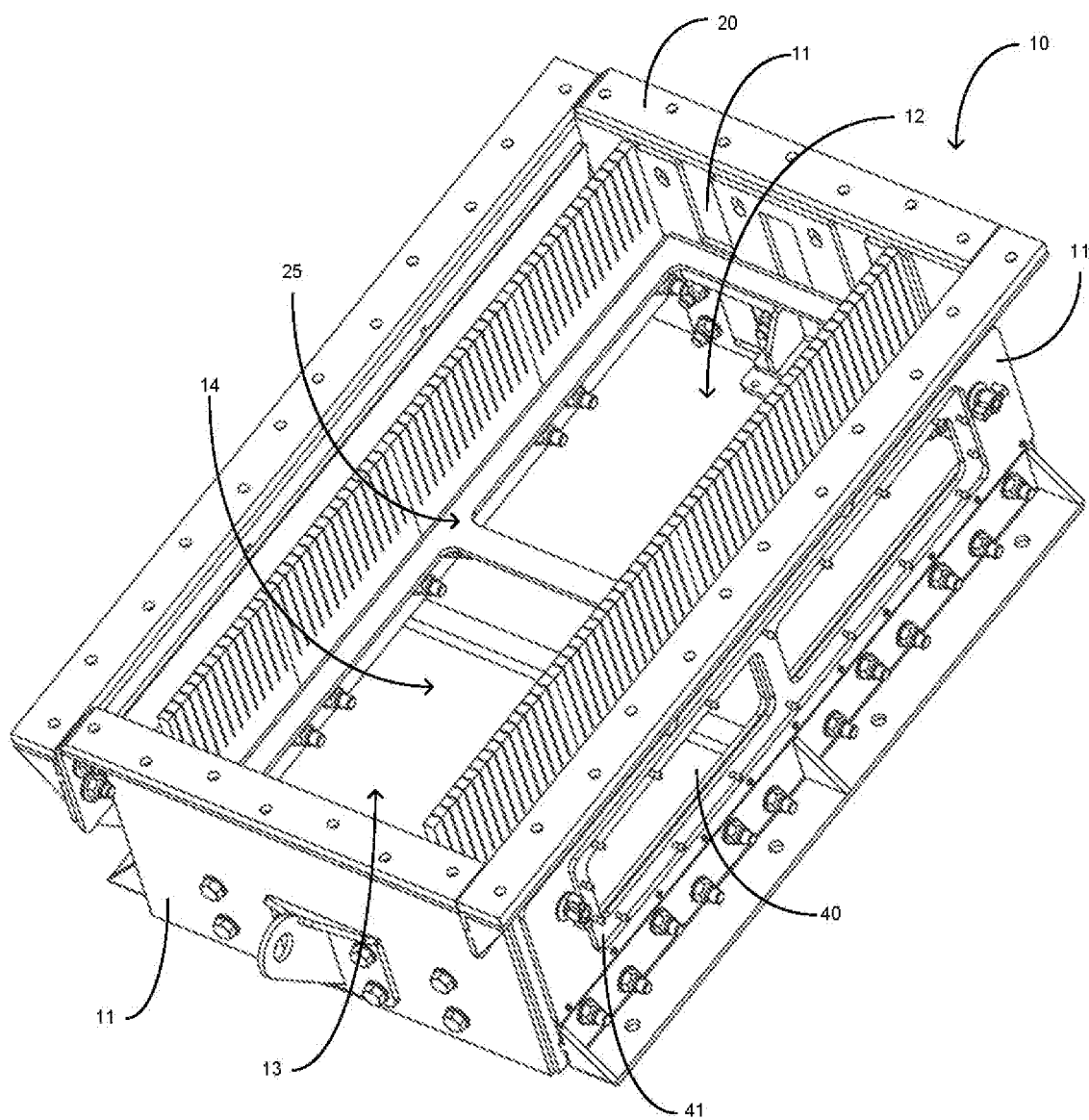
FIG. 7 is a detailed view of the upper portion of the housing of the present invention.

Referring to FIG. 6 submitted herewith, a cross-sectional view of the housing 5 is illustrated therein. The cleaning member support element 25 has operably coupled thereto vertical support members 80, 81. Vertical support members 80, 81 are coupled to the cleaning member support element 25 utilizing suitable techniques and are manufactured from a rigid material such as but not limited to metal. The vertical support members 80, 81 are movably mounted within channels 82, 83. This mounting configuration inhibits any type of movement other than the upwards-downwards movement of the cleaning member support element 25.

Flexing, twisting and other movements that could occur during use of the conveyor belt cleaning apparatus 100 due to influence from a moving conveyor belt or vacuum is inhibited by the vertical support members 80, 81. While not particularly illustrated herein, it should be understood within the scope of the present invention that the cleaning member support element 25 could have vertical support members 80, 81 operably present on the opposing end of the cleaning member support element 25 so as to have the vertical support members 80, 81 on both ends of the cleaning support member 25. It should be further understood within the scope of the present invention that the vertical support members 80, 81 could be manufactured in alternate lengths and widths.

The conveyor belt cleaning apparatus 100 further includes movement member 90. Movement member 90 is operably mounted in cavity 91 formed in the lower portion 15. The movement member 90 has a portion that extends into the interior volume 12 of the upper portion 10 and operably engages the cleaning member support element 25. The movement member 90, specifically the lower portion 93 thereof, is engaged utilizing an appropriate tool and rotatably moved. The rotational movement of the movement member 90 results in either the raising or lowering of the cleaning member support element 25. This provides a desired positioning of the cleaning members 35 against the conveyor belt. While not particularly illustrated herein, it should be understood within the scope of the present invention that the movement member 90 is present on both opposing ends 3, 4 of the lower portion 15. It is contemplated within the scope of the present invention that the movement member 90 could be constructed in alternate manners and achieve the desired objective of facilitating the upwards-downwards movement of the cleaning member support element 25.

While the lower portion 15 has been illustrated and discussed herein as having a first segment 60 and a second segment 70, it is contemplated within the scope of the present invention that the lower portion 15 could have more than two segments formed and constructed as discussed herein for the first segment 60 and second segment 70 of the lower portion 15.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A conveyor belt cleaning apparatus that is configured to provide cleaning of a conveyor belt during operation thereof wherein the conveyor belt cleaning apparatus comprises:
    a housing, said housing having an upper portion and a lower portion, said upper portion of said housing having a plurality of walls defining a shape thereof, said upper portion having an upper end and a lower end, said upper portion having a hollow interior volume, said upper portion having a first opening proximate said upper end and a second opening proximate said lower end, said lower portion being operably coupled to said upper portion proximate the lower end of said upper portion, said lower portion having at least two segments, said at least two segments having an identical shape, said at least two segments of said lower portion having hollow interior volume;
    a cleaning member support element, said cleaning member support element being disposed within the interior volume of said upper portion, said cleaning member support element configured to move in an upwards-downwards direction within said interior volume of said upper portion, said cleaning member support element further comprising two vertical support members, said two vertical support members operably coupled to a bottom of the cleaning member support element and extending downward therefrom, said two vertical support members configured to inhibit twisting of said cleaning member support element; and
    a plurality of cleaning members, said plurality of cleaning members being coupled to said cleaning member support element, said plurality of cleaning members being perpendicular to said cleaning member support element and extending upward therefrom, said plurality of cleaning members being adjacent each other and independently movable.

2. The conveyor belt cleaning apparatus configured to provide cleaning of the conveyor belt as recited in claim 1, wherein said at least two segments of the lower portion of the housing are shaped wherein each of the at least two segments taper down in width from an upper end to a lower end thereof.

3. The conveyor belt cleaning apparatus configured to provide cleaning of the conveyor belt as recited in claim 2, and further including a movement assembly, said movement assembly being operably coupled to said cleaning member support element, said movement assembly having a portion thereof extending outward from said housing.

4. The conveyor belt cleaning apparatus configured to provide cleaning of the conveyor belt as recited in claim 3, wherein said upper portion further includes at least one inspection window, said at least one inspection window being formed in one of said plurality of walls of said upper portion of said housing.

5. The conveyor belt cleaning apparatus configured to provide cleaning of the conveyor belt as recited in claim 4, wherein said upper portion of said housing further includes a drop gate member, said drop gate member being movably coupled to one of said plurality of walls of said upper portion, said drop gate member being movable between a first position and a second position, wherein in said second position said drop gate member providing access to said interior volume of said upper portion.

6. The conveyor belt cleaning apparatus configured to provide cleaning of the conveyor belt as recited in claim 5, and further including lifting members, said lifting members being mounted on opposing ends of said upper portion, said lifting members configured to provide an element for assisting in movement of the housing.

7. The conveyor belt cleaning apparatus configured to provide cleaning of the conveyor belt as recited in claim 6, wherein said at least one inspection window further includes a cover member, said cover member mounted over said at least one inspection member, said cover member being transparent.

8. The conveyor belt cleaning apparatus configured to provide cleaning of the conveyor belt as recited in claim 7, wherein said lower portion of said housing further includes at least one clean-out port, said clean-out port having an opening operable to provide access to the interior volume of said lower portion.

9. A conveyor belt cleaning apparatus that is configured to provide cleaning of a conveyor belt during operation thereof wherein the conveyor belt cleaning apparatus comprises:
    a housing, said housing having an upper portion and a lower portion, said upper portion of said housing having four walls being rectangular in shape, said upper portion having a first end and a second end, said upper portion having an upper end and a lower end, said upper portion having a hollow interior volume, said upper portion having a first opening proximate said upper end and a second opening proximate said lower end, said upper portion having a flange member circumferentially present said first opening, said lower portion being operably coupled to said upper portion proximate the lower end of said upper portion, said lower portion having a first segment and a second segment, said first segment and said second segment being laterally adjacent, said first segment having a hollow interior volume, said second segment having a hollow interior volume, said first segment being comprised of a plurality of walls, said plurality of walls being angular in form and structured to create a width that is greater proximate an upper end of the first segment than a width proximate a lower end of the first segment, said second segment being comprised of a plurality of walls, said plurality of walls being angular in form and structured to create a width that is greater proximate an upper end of the second segment than a width proximate a lower end of the second segment, wherein the angular orientation of the plurality of walls of said first segment and said second segment inhibits material from accumulating within the interior volume of said first segment and said second segment;

a cleaning member support element, said cleaning member support element being disposed within the interior volume of said upper portion, said cleaning member support element configured to move in an upwards-downwards direction within said interior volume of said upper portion, said cleaning member support element having a first longitudinal support member and a second longitudinal support member, said cleaning member support element further having a first lateral support member and a second lateral support member being operably coupled between said first longitudinal support member and said second longitudinal support member at opposing ends thereof forming a rectangular shape for the cleaning member support element, the cleaning member support element further comprising two vertical support elements, said two vertical support elements being coupled to a bottom of the cleaning member support element and extending downward therefrom, said two vertical support elements movably mounted within a channel formed in one of said four walls of said upper portion of said housing; and a plurality of cleaning members, said plurality of cleaning members being coupled to said cleaning member support element, said plurality of cleaning members being perpendicular to said cleaning member support element and extending upward therefrom, said plurality of cleaning members being adjacent each other and independently movable.

10. The conveyor belt cleaning apparatus configured to provide cleaning of the conveyor belt as recited in claim 9, wherein said upper portion of said housing further includes a drop gate member, said drop gate member being movably coupled to one of said plurality of walls of said upper portion, said drop gate member being movable between a first position and a second position, wherein in said second position said drop gate member providing access to said interior volume of said upper portion.

11. The conveyor belt cleaning apparatus configured to provide cleaning of the conveyor belt as recited in claim 10, wherein plurality of cleaning members are independently movable and are manufactured from urethane.

12. The conveyor belt cleaning apparatus configured to provide cleaning of the conveyor belt as recited in claim 11, wherein said upper portion further includes at least one inspection window, said at least one inspection window being formed in one of said plurality of walls of said upper portion of said housing.

13. The conveyor belt cleaning apparatus configured to provide cleaning of the conveyor belt as recited in claim 12, and further including a movement assembly, said movement assembly being operably coupled to said cleaning member support element, said movement assembly having a portion thereof extending outward from said housing, said movement assembly configured to be engaged to facilitate the upwards-downwards movement of the cleaning member support element.

14. The conveyor belt cleaning apparatus configured to provide cleaning of the conveyor belt as recited in claim 13, wherein the angles of the walls of the first segment and second segment of the lower portion are between thirty-five and seventy-five degrees.

\* \* \* \* \*